United States Patent
Foschini et al.

(10) Patent No.: US 9,022,178 B2
(45) Date of Patent: May 5, 2015

(54) ELEVATOR MOTION PROFILE CONTROL FOR LIMITING POWER CONSUMPTION

(75) Inventors: Gianluca Foschini, Ravenna (IT); Sandro Bonfiglioli, Bologna (IT); Leonida Lorquando, Bologna (IT); Ronnie Thebeau, Haddam, CT (US); Sally Mahoney, New Hartford, CT (US)

(73) Assignee: Otis Elevator Company, Farmington, CT (US)

( * ) Notice: Subject to any disclaimer, the term of this patent is extended or adjusted under 35 U.S.C. 154(b) by 2514 days.

(21) Appl. No.: 11/573,943

(22) PCT Filed: Oct. 14, 2004

(86) PCT No.: PCT/US2004/033922
§ 371 (c)(1),
(2), (4) Date: Oct. 28, 2009

(87) PCT Pub. No.: WO2006/043926
PCT Pub. Date: Apr. 27, 2006

(65) Prior Publication Data
US 2010/0126809 A1   May 27, 2010

(51) Int. Cl.
*B66B 1/28* (2006.01)
*B66B 1/30* (2006.01)

(52) U.S. Cl.
CPC .............. *B66B 1/302* (2013.01); *Y02B 50/125* (2013.01)

(58) Field of Classification Search
CPC .............................. B66B 1/302; Y02B 50/125
USPC ......... 187/247, 290, 293, 296, 297, 391–393; 318/59, 66, 98; 388/904
See application file for complete search history.

(56) References Cited

U.S. PATENT DOCUMENTS

| | | | |
|---|---|---|---|
| 4,751,984 A | | 6/1988 | Williams et al. |
| 5,035,301 A | * | 7/1991 | Skalski .................... 187/295 |
| 5,076,399 A | * | 12/1991 | Horbruegger et al. ........ 187/293 |
| 5,241,141 A | | 8/1993 | Cominelli |
| 5,266,757 A | * | 11/1993 | Krapek et al. ................ 187/295 |
| 5,298,695 A | | 3/1994 | Bahjat et al. |
| 5,984,052 A | | 11/1999 | Cloux et al. |

(Continued)

OTHER PUBLICATIONS

PCT International Preliminary Report on Patentability relating to International Application No. PCT/US2004/033922 mailed Feb. 14, 2007.

(Continued)

*Primary Examiner* — Anthony Salata
(74) *Attorney, Agent, or Firm* — Carlson, Gaskey & Olds

(57) ABSTRACT

An elevator system (20) includes a propulsion power assembly (38) with a power rating below that required to move a fully loaded elevator car (22) using a contract or design motion profile. One example propulsion power assembly (38) uses more than one motion profile based upon existing load conditions. One example uses a first motion profile including a first power parameter limit for load conditions at or below a selected load threshold that is less than a maximum load capacity of the car (22). The propulsion power assembly (38) uses a second motion profile with a lower power parameter limit for other load conditions. In one example, electrical current is the power parameter selected as a decision parameter dictating which profile to select based on an existing load. Another example propulsion power assembly (38) selects at least one of a speed limit or an electrical current limit based on an existing load and maintains a speed to stay within the selected limit.

19 Claims, 3 Drawing Sheets

(56) References Cited

U.S. PATENT DOCUMENTS

| | | | |
|---|---|---|---|
| 6,164,416 A * | 12/2000 | Laine et al. | 187/284 |
| 6,199,667 B1 | 3/2001 | Fischgold et al. | |
| 6,619,434 B1 | 9/2003 | Peters et al. | |
| 7,011,184 B2 * | 3/2006 | Smith et al. | 187/281 |
| 7,740,112 B2 * | 6/2010 | Iwata et al. | 187/393 |
| 7,921,969 B2 * | 4/2011 | Stolt et al. | 187/391 |

OTHER PUBLICATIONS

PCT Written Opinion of the International Searching Authority for International Application No. PCT/US04/33922 filed Oct. 14, 2004.

PCT International Search Report for International Application No. PCT/US04/33922 filed Oct. 14, 2004.

* cited by examiner

ELEVATOR MOTION PROFILE CONTROL FOR LIMITING POWER CONSUMPTION

FIELD OF THE INVENTION

This invention generally relates to elevator systems. More particularly, this invention relates to controlling an elevator motion profile.

DESCRIPTION OF THE RELATED ART

Elevator systems include a machine for moving an elevator car to provide desired passenger service, for example. Some elevator systems are traction-based and include a motor that rotates a traction sheave to move a load bearing member in a manner that causes a desired movement of an elevator car. Hydraulic-based systems include a motor and pump for establishing an appropriate amount of hydraulic pressure to cause desired movement of an elevator car.

Elevator system motors typically are selected with a power rating sufficient to move the elevator car at a contract speed or design speed when the elevator car is fully loaded at maximum capacity. Most elevator systems operate using a single motion profile regardless of the load conditions of the car. The motion profile typically includes operating parameters based upon the motor size that achieve a desired speed of car movement.

There have been proposals to use more than one motion profile to accommodate various load situations in an elevator system. U.S. Pat. No. 5,241,141, for example, utilizes faster movement and higher acceleration rates when moving an empty elevator car. Such an arrangement takes advantage of the higher speeds and acceleration rates that are possible when the car is empty because the motor rating is intended to move a fully loaded car.

U.S. Pat. No. 6,619,434 proposes another approach. That patent suggests moving an elevator car at a contract or design speed at highly loaded conditions and moving the car faster at lower loaded conditions. Such an arrangement requires a motor rating capable of reaching the design speed at a fully loaded condition.

One aspect of known systems is that the selected motor size is capable of handling loads that are rarely encountered during normal elevator system operation. Sizing the motor to reach a contract speed using a contract profile at a fully loaded condition results in having a motor that is bigger than needed for most operating conditions. Elevator cars typically are loaded between 20% and 80% of the maximum load capacity. Having a motor sized to handle full speed at maximum load introduces expense into the system that is not needed for the majority of elevator system operation. Additionally, the larger motors and associated drive components typically consume more power, which may be considered inefficient under some circumstances.

This invention provides an alternative arrangement that introduces economies into an elevator system, in part, by utilizing a smaller propulsion power assembly, which includes a motor, a drive and associated electronics or electrical components for moving an elevator car, and consuming less power.

SUMMARY

An example device for use in an elevator system includes a propulsion power assembly (PPA) for moving an elevator car. The PPA has a power rating corresponding to moving the elevator car using a contract profile for a load up to a selected load threshold that is less than the maximum load capacity of the elevator car.

In one example, the PPA moves the elevator car using a first motion profile including a first electrical current limit when there is a first load condition at or below the selected load threshold. The PPA moves the elevator car using a second motion profile including a second, lower electrical current limit when there is a second load condition above the selected load threshold.

In one example, the PPA uses the second motion profile to move an empty car in a downward direction.

In another example, a PPA stays within a selected power limit by maintaining the speed below a limit chosen based on an existing load. With such a PPA in a hydraulic elevator system, for example, it is possible to have a smaller motor to consume less power yet achieve higher average speeds to realize improved traffic capacity.

An example method of controlling movement of an elevator car using a PPA that has a power rating corresponding to moving the elevator car using a contract profile for a load up to a selected load threshold that is less than a maximum load capacity of the elevator car includes using a first motion profile including a first power limit for a load at or below the selected load threshold. The method also includes using a second motion profile including a second, lower power limit when there is a second load condition above the selected load threshold.

In one example, the second motion profile is predetermined and used for all load conditions above the selected load threshold. In another example, the second motion profile is automatically determined based upon current load conditions.

In one example, power consumption is managed by choosing the motion profile to satisfy a selected maximum current draw. In another example, the motion profile is selected based upon maintaining a selected speed limit corresponding to an existing load condition.

The various features and advantages of this invention will become apparent to those skilled in the art from the following detailed description of currently preferred embodiments. The drawings that accompany the detailed description can be briefly described as follows.

DETAILED DESCRIPTION

Figure 1:
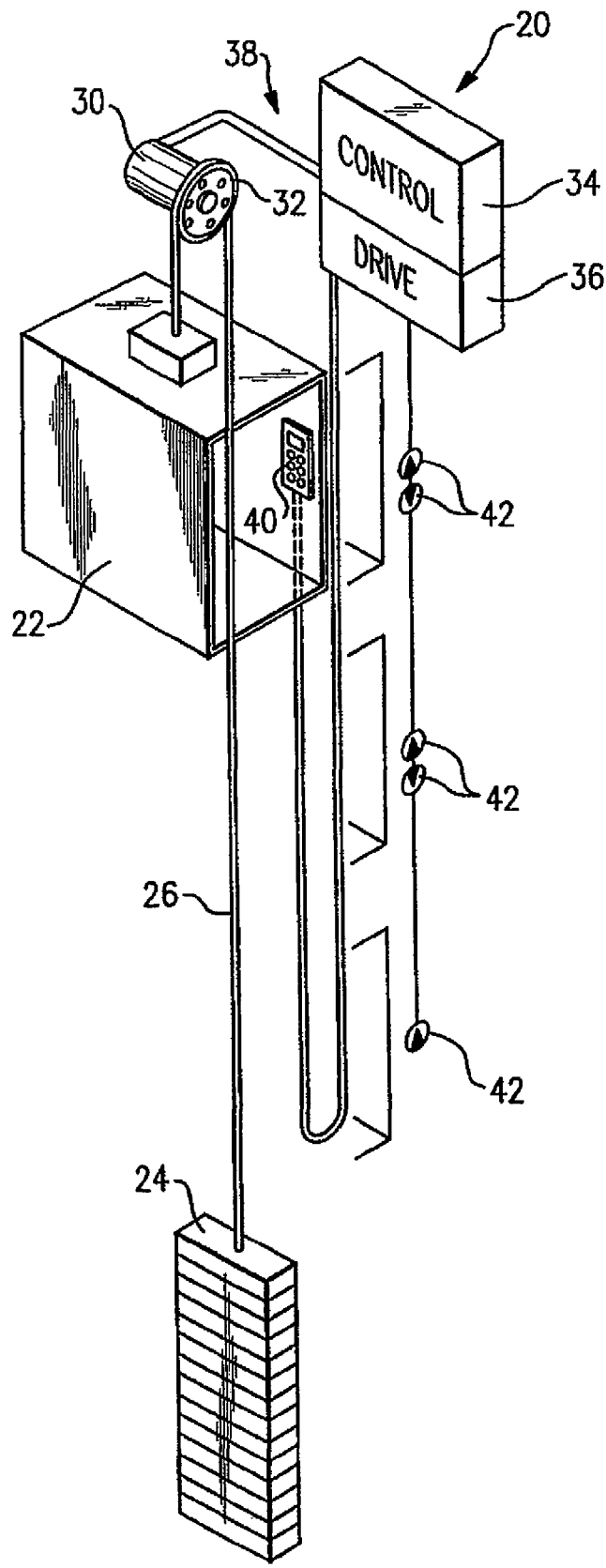
FIG. 1 schematically illustrates selected portions of one example elevator system that utilizes multiple motion profiles.

FIG. 1 schematically illustrates selected portions of an elevator system 20. An elevator car 22 is coupled with a counterweight 24 by a load bearing assembly 26 in a known manner. A motor 30 causes rotation of a traction sheave 32, which results in movement of the elevator car 22 and counterweight 24. A traction-based elevator system is illustrated for discussion purposes. This invention is not limited to such arrangements and is useful in hydraulic elevator systems, for example. As known, hydraulic elevator systems include a motor and an associated pump to generate sufficient hydraulic pressure to achieve desired elevator car movement.

An elevator system controller 34 includes a drive portion 36 that controls operation of the motor 30. The controller 34 in one example includes software, hardware, firmware or a combination of these for selectively using a motion profile for moving the elevator car 22 based upon the load condition and a direction of movement, for example.

The illustrated example schematically shows the motor 30 and the drive portion 36, both of which are part of a propulsion power assembly (PPA) 38. The PPA in one example includes other electronics or electrical devices (not illustrated) that are associated with providing propulsion power for moving the elevator car 22.

In one example, the PPA 38 has a power rating that is less than a typical power rating for a given elevator system size or capacity. The example PPA 38 is selected based upon a desired level of power consumption and available torque to achieve a maximum desired contract speed or design speed using a contract or design motion profile while moving loads up to a selected load threshold that is less than a maximum load capacity of the system 20.

One example way of selecting the power rating of the PPA 38 includes selecting the size of the motor 30 to have a particular power rating. In one example hydraulic elevator system, a 6 Kilowatt motor rating is selected for a maximum load capacity that requires a 7.7 Kilowatt motor rating to move the maximum load at the maximum contract speed using the contract motion profile. In one example traction elevator system, a 2 Kilowatt motor rating is used instead of a 4 Kilowatt motor rating.

Having a motor with a rating that is only capable of achieving a design speed for loads below the maximum load capacity reduces the size and expense of the required motor. Using a smaller motor also reduces power consumption and avoids the expenses typically incurred by having excess power available for most elevator system operating conditions. In many examples, there is some sacrifice in speed or flight time when transporting loads between the selected threshold and the maximum load capacity. The smaller motor rating requires using slower speeds or slower accelerations for such situations. Even though a smaller motor is used and lower speeds or slower accelerations are used for load conditions exceeding the selected load threshold, such conditions occur infrequently enough that overall elevator system operation will not be noticeably compromised. Any such sacrifice occurs infrequently and is outweighed by the improved economies associated with using a smaller motor.

The same considerations and advantages apply to selecting other PPA components (i.e., the drive portion 36) to achieve the lower power rating.

In one example, the selected load threshold is approximately 80% of the maximum load capacity of the elevator system. In another example, the selected load threshold is approximately 95% of the maximum load capacity. Given this description, those skilled in the art will be able to select an appropriate load threshold, which will dictate a PPA power rating selection to meet the needs of their particular situation.

In one example, the selected threshold is chosen so that the PPA 38 uses a first motion profile for most operating conditions of the elevator system. In other words, the drive portion 36 operates the motor 30 uses the first motion profile for most operating conditions of the elevator system. The first motion profile in this example includes having the elevator car 22 move at a design or contract speed using a contract motion profile whenever the load is at or below the selected load threshold.

Under selected conditions, such as when the load exceeds the selected threshold and would exceed the capabilities of the PPA 38 if the car were to be propelled at the full contract or design speed, the PPA 38 uses a second motion profile. In one example, the second motion profile includes a second, lower speed for moving the elevator car 22 based upon a current loaded condition. In another example, the second motion profile includes a second, lower acceleration limit, which can be customized based upon an existing load.

Figure 2:
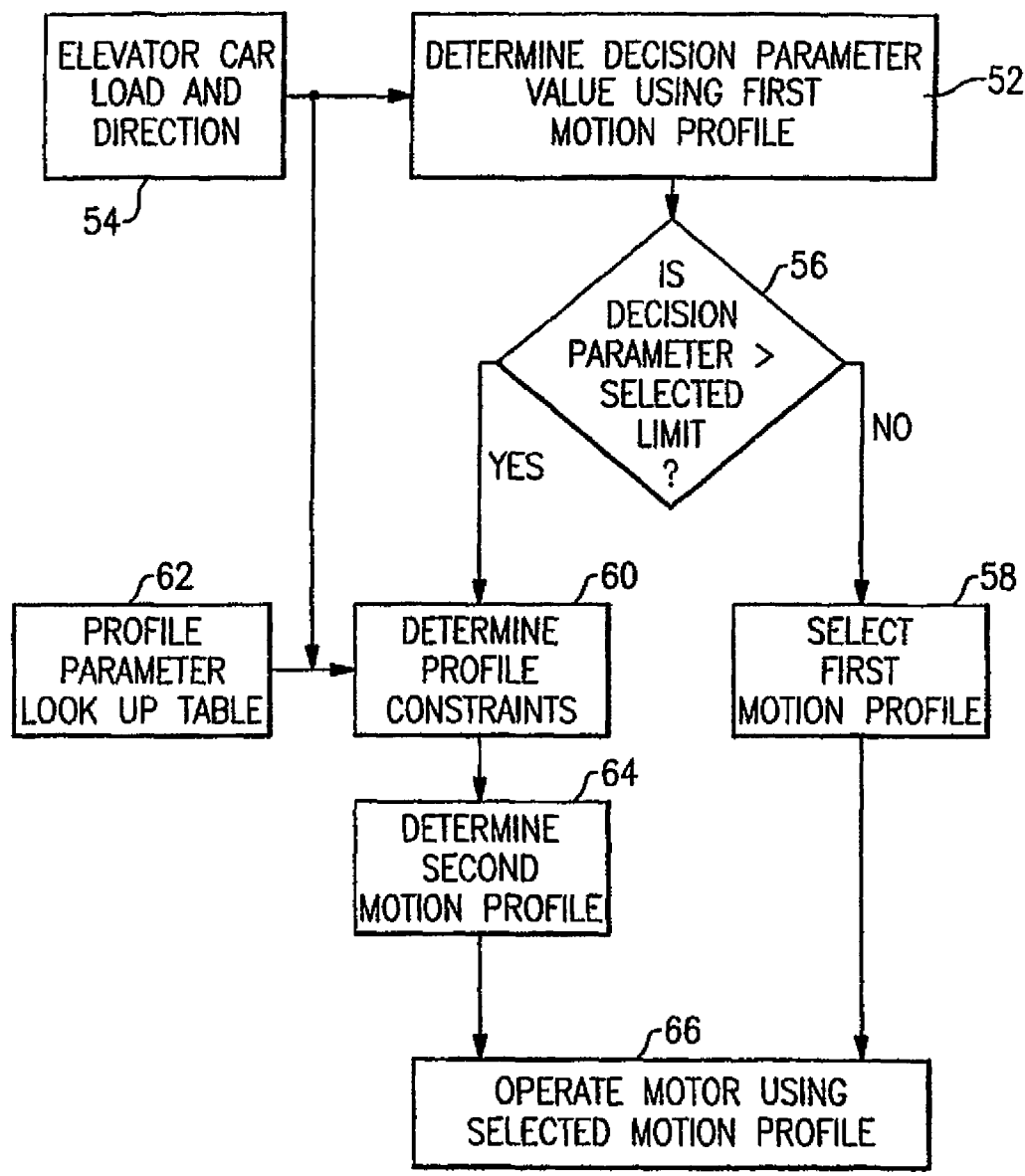
FIG. 2 is a flowchart diagram summarizing one example approach for controlling a motion profile.

Referring to FIG. 2, a flowchart 50 summarizes one example approach for selecting which motion profile to use at any given time. Assuming that the car 22 must be moved responsive to a call placed by using a car operating panel 40 or hall call buttons 42 in a known manner, for example, the controller 34 determines a motion profile for controlling the motor 30 for moving the elevator car 22.

In FIG. 2, this process begins at 52 by determining an expected value of a decision parameter associated with using the first motion profile. The determination at 52 in this example includes considering information 54 regarding an existing load condition and the direction of movement for responding to a call. One example includes using known techniques for determining such information. The load can be determined using known sensors, for example. One example includes utilizing a load sensor associated with the car. Another example includes using a sensor that monitors motor operation or input and output values that are detectable in a known manner. Another example uses a tension monitor associated with the load bearing assembly 26. Still another example uses a combination of such sensors.

The decision parameter may vary depending on the needs of a particular situation. Example decision parameters include current draw at the motor 30, motor acceleration, car acceleration, motor voltage, motor speed or car speed. One example uses more than one decision parameter. When the decision parameter comprises acceleration or maximum current draw, for example, the PPA is designed with a drive selected to satisfy a chosen power consumption criteria. When the decision parameter comprises speed, for example, the PPA is designed with a motor selected to satisfy a chosen power consumption criteria.

Given the motor rating and information regarding the load and direction of movement, the controller 34 determines what the value of the decision parameter will be if the car were moved using the first motion profile.

At 56, the controller 34 determines whether the decision parameter exceeds a set limit. If the load and the PPA power rating are such that the decision parameter is not beyond a set limit, the first motion profile may be used. In one example, the first motion profile will be used for the majority of elevator system operation conditions.

In one example, the first motion profile can be customized so that one or more parameters within the first motion profile can be varied within selected limits. In another example, the first motion profile is preset upon system design or installation. An example first motion profile includes using the contract or design motion profile whenever possible.

In the event that the decision parameter exceeds a selected limit, the example of FIG. 2 continues at 60, determining profile constraints for the second motion profile. In the illustrated example, profile parameter information from a look up table 62 and the load and direction information from 54 are considered, using known techniques (based at least in part on the selected PPA power rating) for determining the constraints on the second motion profile. At 64, the second motion profile is determined. In the illustrated example, the controller 34 automatically and dynamically determines the second motion profile to customize that profile based upon an existing load condition. For example, different speeds or different acceleration limits can be selected for different loads that exceed the selected load threshold. In one example, the motion profile is customized and adjusted as desired as the elevator car 22 is moving.

In another example, a preset second motion profile is used for all situations where the first motion profile will not work or is not desired. Another example includes a plurality of prestored second motion profiles. The controller 34 in the latter example selects one of the available second motion profiles based upon existing conditions. Given this description, those skilled in the art will be able to suitably program a controller 34 to select at least one appropriate second motion profile to meet the needs of their particular situation.

Once the appropriate motion profile has been selected, the PPA 38 uses the selected motion profile at 66 to respond to a call. The controller 34 repeats the process of selecting a motion profile when responding to each call.

Figure 3A:
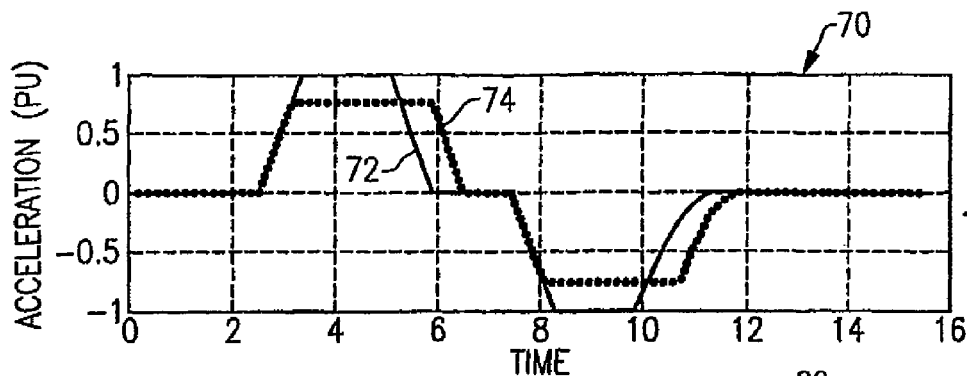
FIGS. 3A-3C graphically illustrate performance features of one example embodiment.
Figure 3B:
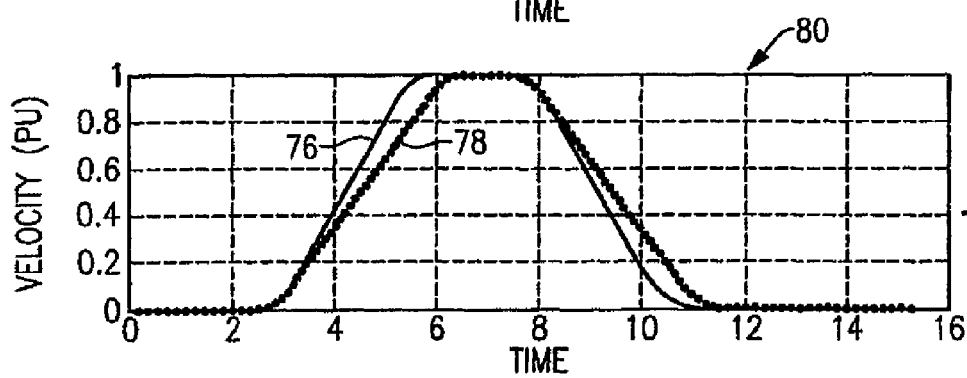
Figure 3C:
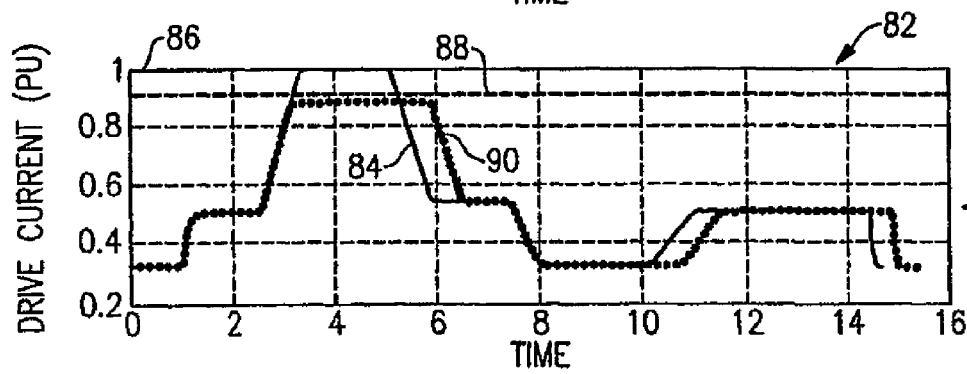

FIGS. 3A-3C graphically illustrate performance parameters of one example embodiment. In this embodiment, maximum current draw is the decision parameter for selecting the first or second motion profile. The level of current draw used for a particular second motion profile also may be selected from among various possibilities and the selection will, at least in part, dictate the parameters of the motion profile.

In FIG. 3A, a plot 70 of acceleration versus time includes a first curve 72 that corresponds to the acceleration associated with using the first motion profile to respond to a call when the existing load is at or below the selected threshold used when designing the PPA 38. As can be appreciated from the drawing, the acceleration rate reaches a maximum acceleration value (i.e., 100%) at appropriate times while responding to the call. Another curve 74 shows the acceleration associated with a second motion profile under a more heavily loaded condition, for example. As can be appreciated from the drawing, the maximum acceleration achieved using the second motion profile is reduced compared to that of the first motion profile shown at 72.

FIG. 3B includes a plot 80 of velocity versus time corresponding to the plot 70 of FIG. 3A. A first curve 76 shows a car velocity corresponding to the acceleration shown in the curve 72 of FIG. 3A. Another curve 78 shows the car velocity of the second motion profile associated with the acceleration curve 74. It is apparent from the drawing that the total flight time using the second motion profile is longer even though the same maximum speed is used with each profile. This additional flight time is the result of using a lower acceleration limit (i.e., curve 74 instead of curve 74). In this example, the maximum current draw limit dictates the acceleration limits.

FIG. 3C includes a plot 82 of drive current versus time. It is known that drive current is proportional to torque, which is proportional to acceleration. Accordingly, the curves in FIG. 3C are generally proportional to the curves in FIG. 3A.

A first drive current versus time curve 84 shows the current draw using the first motion profile. A maximum current draw limit 86 occurs at the same time as the maximum acceleration on the curve 72. This maximum current draw limit 86, based on the PPA power rating, is available for load conditions at or below the selected load threshold, which is less than the maximum load carrying capacity of the elevator system 20.

A lower current limit 88 is required for higher load conditions because of the selected PPA power rating. The lower current level limit 88 places a limit on the current draw using the second motion profile as shown by the curve 90. This corresponds to the lower total acceleration rate 74 in FIG. 3A.

As current draw, torque and acceleration are all related, a PPA 38 using the technique of the example illustrated in FIGS. 3A-3C may be suitably arranged or programmed to use any one of those parameters depending on the available inputs to the PPA 38. Given this description, those skilled in the art will be able to select an appropriate control parameter and to suitably design or program a PPA to meet their particular needs.

In one example, the second motion profile is also used for moving the elevator car 22 downward when the car is empty. The unbalanced load movement associated with moving the counterweight 24 upward when the car 22 is empty may tax a PPA having a power rating selected as described above. This may be particularly true when moving the elevator car 22 from a top floor landing (i.e., a highest possible car position) down to a lobby or lowest floor landing. Under these circumstances, the counterweight has to travel from a lowest possible position to a much higher position and a counterweight typically weighs more than an unloaded car. For such situations, the second motion profile may be used. One example includes determining a position of the elevator car 22 and using the second motion profile when the car is above a selected building level.

Figure 4:
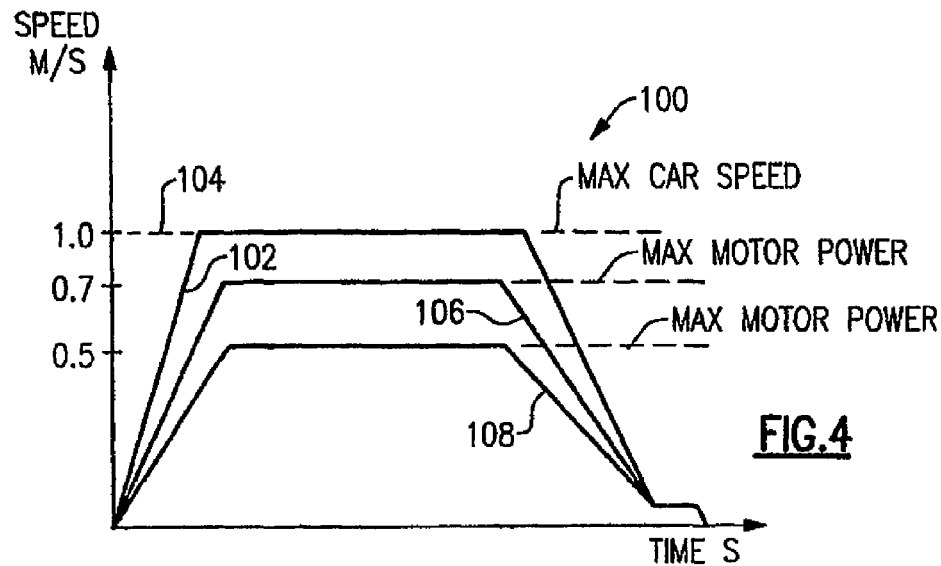
FIG. 4 graphically illustrates performance features of another example embodiment.

In another example, speed, which is proportional to voltage, is the selected control parameter of interest. FIG. 4 graphically shows one example technique for using speed as the control parameter. In this example, the controller 34 effectively determines the existing load, selects a maximum speed based upon the load and then accelerates the motor 30 until the maximum speed is reached. The drive portion 36 controls the motor 30 not to exceed the desired speed for the existing load condition.

A plot 100 shows elevator speed versus time. A first speed curve 102 reaches a maximum car speed 104. The speed curve 102 may be used to move an empty car upward, for example. As the car approaches a destination, the PPA 38 reduces the speed.

Another curve 106 does not reach the same speed but utilizes maximum available PPA power to carry a heavier load. Still another curve 108 has a lower maximum speed but utilizes the same, maximum PPA power for a still heavier load. In the illustrated example, the travel distances are different for each of the curves as the maximum speeds are different but the total flight time is the same. If the illustrated maximum speeds were used for three different loads carried the same distance, the length along the time axis (i.e., from right to left in the drawing) would be longest for the curve 108.

Using the technique shown in FIG. 4, it is possible to achieve speeds above the contract or design speed for a hydraulic elevator system, for example. Assuming the contract speed is 0.6 m/s, the speed curve 108 is below the contract speed. The curve 102 (0.7 m/s maximum speed) and the curve 106 (1 m/s maximum speed) exceed the contract speed. In one example, when the car is fully loaded, which corresponds to a pressure of 36 bar at the pump, the motion profile corresponding to the curve 108 requires full PPA power to move the car upward at a speed below the contract speed. When the car load is only 50% capacity, which corresponds to 28 bar at the pump in this example, the motion profile corresponding to the curve 106 provides a 0.7 m/s speed at maximum power (i.e., 6 KW), An empty car, which corresponds to 20 bar at the pump, can move at 1 m/s (curve 102) at the maximum PPA power. With this technique, even though a smaller PPA power rating was chosen compared to the typical power rating for a given system load capacity (i.e., a 6 KW motor instead of a 7.7 KW motor) and less power is consumed, there is no sacrifice in performance. In this example, the average speed (0.75 m/s for the illustrated example) exceeds the contract speed so that system performance increases even though power consumption decreases.

For an example traction elevator system, a PPA 38 including a motor 36 having a 4 Kilowatt rating can move the maximum capacity load at a contract speed of 1 m/s. The plot 100 of FIG. 4 corresponds to the same traction elevator system having a motor with a 2 Kilowatt rating. The curve 108 in this example corresponds to moving a fully loaded car upward at the highest possible speed (0.5 m/s) at maximum power, given the selected power rating of the PPA 38. The curve 106 has a maximum speed of 0.7 m/s to move an 80% capacity load upward. The curve 102 shows that the contract speed of 1 m/s is achievable for a 50% capacity load (i.e., a fully balanced car and counterweight). For this example, the maximum PPA power permits moving an empty car down at a 0.5 m/s, a 30% capacity load down at 0.8 m/s and a 50% capacity load down at the contract speed of 1 m/s. For this example, the average speed is reduced by 25% because of the smaller motor but that is acceptable given that the power consumption is 50% less than it would have been with the larger motor mentioned above.

In another example, the current draw is the selected control parameter of interest. In this example, the drive portion 36 determines a maximum allowable current draw for a given load condition. The drive portion 36 monitors the current draw and controls the speed based upon reaching the maximum allowable current limit. The drive portion 36 accelerates the motor at an increasing acceleration rate until the current draw reaches the maximum value based upon the PPA power rating. At that point, the drive portion 36 stops changing the acceleration rate to avoid a higher current draw but may continue accelerating the motor using a constant acceleration until the car reaches the desired speed for the existing load conditions.

Another example drive portion 36 uses speed and current draw as control parameters as described in the preceding five paragraphs. In this example, if either threshold (i.e., speed or current) is reached, the drive portion 36 reacts to maintain a desired power consumption level.

A variety of techniques for controlling a motion profile using a PPA power rating below that required for reaching a contract or design speed using a contract or design motion profile at a fully loaded capacity are disclosed. Those skilled in the art will appreciate that one or more portions of the disclosed techniques could be combined into another technique or used in parallel with each other.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:
    an elevator car;
    a propulsion power assembly for moving the elevator car, the propulsion power assembly having a power rating corresponding to moving the elevator car using a design motion profile for a load up to a selected load threshold that is less than a maximum load capacity of the elevator car.

2. The system of claim 1, wherein the propulsion power assembly uses a first motion profile including a first power parameter limit when there is a first load condition at or below the selected load threshold and a second motion profile including a second, lower power parameter limit when there is a second load condition above the selected load threshold.

3. The system of claim 2, wherein the first and second power parameters limits comprise first and second electrical current limits, respectively.

4. The system of claim 2, wherein the first motion profile corresponds to moving the elevator car using the design motion profile.

5. The system of claim 2, wherein the propulsion power assembly uses the second motion profile for moving the car in a downward direction when the load is below a second selected threshold.

6. The system of claim 5, wherein the propulsion power assembly uses the second motion profile for moving the car downward when the car is empty.

7. The system of claim 2, wherein the propulsion power assembly automatically determines at least one parameter of the second motion profile based upon at least an existing load condition.

8. The system of claim 1, wherein the propulsion power assembly selects a speed limit based on an existing load and accelerates up to the selected speed.

9. The system of claim 8, wherein the propulsion power assembly selects a speed limit that exceeds the design speed for at least one load condition.

10. The system of claim 1, wherein the propulsion power assembly selects an electrical current draw limit based on an existing load and accelerates in a manner that does not exceed the electrical current draw limit.

11. A method of controlling movement of an elevator car having an associated maximum load capacity, comprising:
    selecting a propulsion power assembly having a power rating capable of moving the elevator car using a design motion profile for a load up to a selected load threshold that is less than the maximum load capacity of the elevator car.

12. The method of claim 11, comprising:
    using a first motion profile including a first power parameter limit when there is a first load condition at or below the selected load threshold; and
    using a second motion profile including a second, lower power parameter limit when there is a second load condition above the selected load threshold.

13. The method of claim 12, wherein the first and second power parameter limits comprise first and second electrical current limits, respectively.

14. The method of claim 12, including automatically determining at least one parameter of the second motion profile based at least in part on an existing load.

15. The method of claim 12, wherein the first motion profile includes moving the elevator car using the design motion profile.

16. The method of claim 11, comprising:
    using a first motion profile including a first power parameter limit when there is a first load condition at or below the selected load threshold; and
    moving the elevator car downward using a second motion profile including a second, lower power parameter limit when there is a second load condition below a second, lower load threshold.

17. The method of claim 11, comprising:
    determining an existing load;
    selecting a speed limit based at least in part on the determined existing load; and
    maintaining a speed at or below the selected speed limit.

18. The method of claim 17, including selecting the speed limit to exceed a design speed of the design motion profile for at least one load condition.

19. The method of claim 11, comprising:
  determining an existing load;
  selecting an electrical current limit based at least in part on the determined existing load; and
  maintaining an electrical current draw at or below the selected electrical current limit.

\* \* \* \* \*